Dec. 13, 1938.  B. G. CARLSON  2,139,878

HYDROPNEUMATIC AUTOMATIC PILOT

Original Filed June 19, 1936  2 Sheets-Sheet 1

INVENTOR
Bert G. Carlson
BY Herbert H. Thompson
HIS ATTORNEY

Dec. 13, 1938.   B. G. CARLSON   2,139,878
HYDROPNEUMATIC AUTOMATIC PILOT
Original Filed June 19, 1936   2 Sheets-Sheet 2

INVENTOR
*Bert G. Carlson*
BY *Herbert H. Thompson*
HIS ATTORNEY.

Patented Dec. 13, 1938

2,139,878

UNITED STATES PATENT OFFICE 2,139,878

HYDROPNEUMATIC AUTOMATIC PILOT

Bert G. Carlson, Freeport, N. Y., assignor to Sperry Gyroscope Company, Inc., Brooklyn, N. Y., a corporation of New York Application June 19, 1936, Serial No. 86,036
Renewed February 18, 1938

21 Claims. (Cl. 244—78)

This invention relates, generally, to hydropneumatic automatic pilots such as disclosed in my prior Patent #1,992,970, joint with E. A. Sperry and M. F. Bates, and the invention has reference, more particularly, to improvements therein involving a novel hydraulic follow-up and level flight control means.

In the disclosure of the above patent and in similar devices heretofore used, mechanical follow-up connections such as links or cables extend from the hydraulic servomotors or from the control surfaces to the controlling gyroscopes or other control unit or position maintaining means, that are generally located on the pilot's dash. It is desirable, in order to reduce the length of control surface operating cables to a minimum, to place the servomotors as near the control surfaces actuated thereby as possible. Hence, the mechanical follow-up connections are generally somewhat lengthy and therefore not only complicate the system but may become deranged in use.

The principal object of the present invention is to provide a novel hydraulic follow-up for automatic pilots, which follow-up is so constructed and arranged as to adapt the same to be located at the master hydraulic valve adjacent the controlling gyroscope, thereby eliminating long lengths of mechanical follow-up connections and simplifying the automatic pilot apparatus, while enhancing the reliability of the system in use.

Another object of the present invention lies in the provision of a novel hydraulic follow-up of the above character, wherein movement or pressure of the operating fluid discharged from the servomotor during the operation of a control surface is employed for operating the hydraulic follow-up means.

Still another object of the present invention is to provide means cooperable with said hydraulic follow-up for maintaining the aircraft at approximately any desired flying level regardless of changes in the position of the center of gravity of the craft due, for example, to movement of passengers, and regardless of changes in weight of the craft due, for example, to the consumption of fuel.

Other objects and advantages will become apparent from the specification, taken in connection with the accompanying drawings wherein one embodiment of the invention is illustrated.

In the drawings.

Similar characters of reference are used in the above views to indicate corresponding parts.

Figure 1:
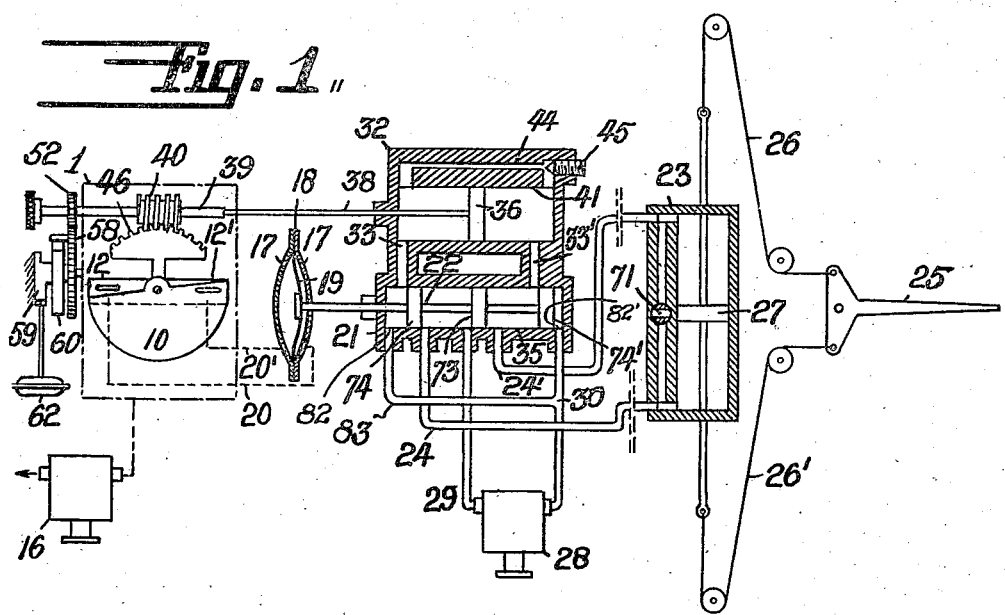
Fig. 1 is a schematic view, largely in section, illustrating the improvements of this invention.

Referring now to the said drawings, the reference numeral 1 designates the gyro vertical or artificial horizon unit of the automatic pilot, although this invention is equally applicable to the directional gyro unit, or any other position, attitude or direction maintaining device, the latter being omitted for the sake of simplicity. The unit 1 comprises an air spun gyro (not shown) mounted for spinning on a vertical axis within rotor bearing casing 2, which in turn is pivoted on horizontal trunnions 3 in gimbal ring 4. Ring 4, in turn, is mounted for oscillation on horizontal pivots 5 in the main frame 6. In order to take off controls from both axes, there is shown a circular bail or loop 7 pivoted on trunnions 8 in main frame 6, said trunnions being preferably normally in line with the trunnions 3. Loop 7 has a rolling contact with a roller 9 at the bottom of the gyroscope, which is guided between U-shaped sides of the loop. The loop 7, therefore, partakes of the oscillation of the gyroscope about minor axis 3, 3, but not of its oscillation about its major axis 5, 5.

Loop or bail 7 has secured to one end thereof a semi-circular shutter 10 provided with horizontal knife edges 11 which normally bisect horizontal ports 12 and 12' provided in a common frame member 13 pivotally mounted on frame 6 concentric with trunnions 8. The cooperation of knife edges 11 and ports 12 provides a control means for controlling the elevators of the craft.

As especially shown in Fig. 1, an air suction pump 16 is shown evacuating air from the housing of gyro unit 1, thereby causing air to enter apertures 17 in casing 18 surrounding a flexible diaphragm 19, which air flows through pipes 20 and 20' to the ports 12 and 12', respectively.

Similarly, there is provided a semicircular shutter 10' secured to the gimbal 4, cooperating with similar air ports 14 and 14' provided in a common frame member 15 pivoted on the main frame 6 for controlling the ailerons of the craft. Ports 14 and 14' are similarly supplied with air from pipes connected to the casing of a second diaphragm (not shown) similar to diaphragm 19. The structure so far described is similar to that disclosed in the aforesaid Patent #1,992,970, and hence requires no further description.

The flexible diaphragm 19 is connected to the balanced piston 22 movable within the bore 35 of a master hydraulic valve 21 located adjacent the gyro unit 1. Valve 21 is adapted to control the supply of pressure operating fluid through pipes 24 and 24' to servo motor 23, having an operating piston 27 connected through cables 26 and 26' for operating the elevator or elevators 25. Preferably, the servomotor 23 is located as near the control surface or elevator 25 as possible to reduce the length of transmission cables 26 and 26', or equivalent means, to a minimum, the only connection between the remote servo motor 23 and the valve 21 being pipes 24 and 24', the elevator hydraulic follow-up connection being removed from the servomotor 23 and elevator 25 and being associated with the master control valve 21. Valve 21 is adapted to receive pressure fluid, such as oil, from suitable pump means 28 through pipe 29, the return of pressure fluid to pump 28 from valve 21 being through pipe 30 or pipes 31 and 30.

Figure 2:
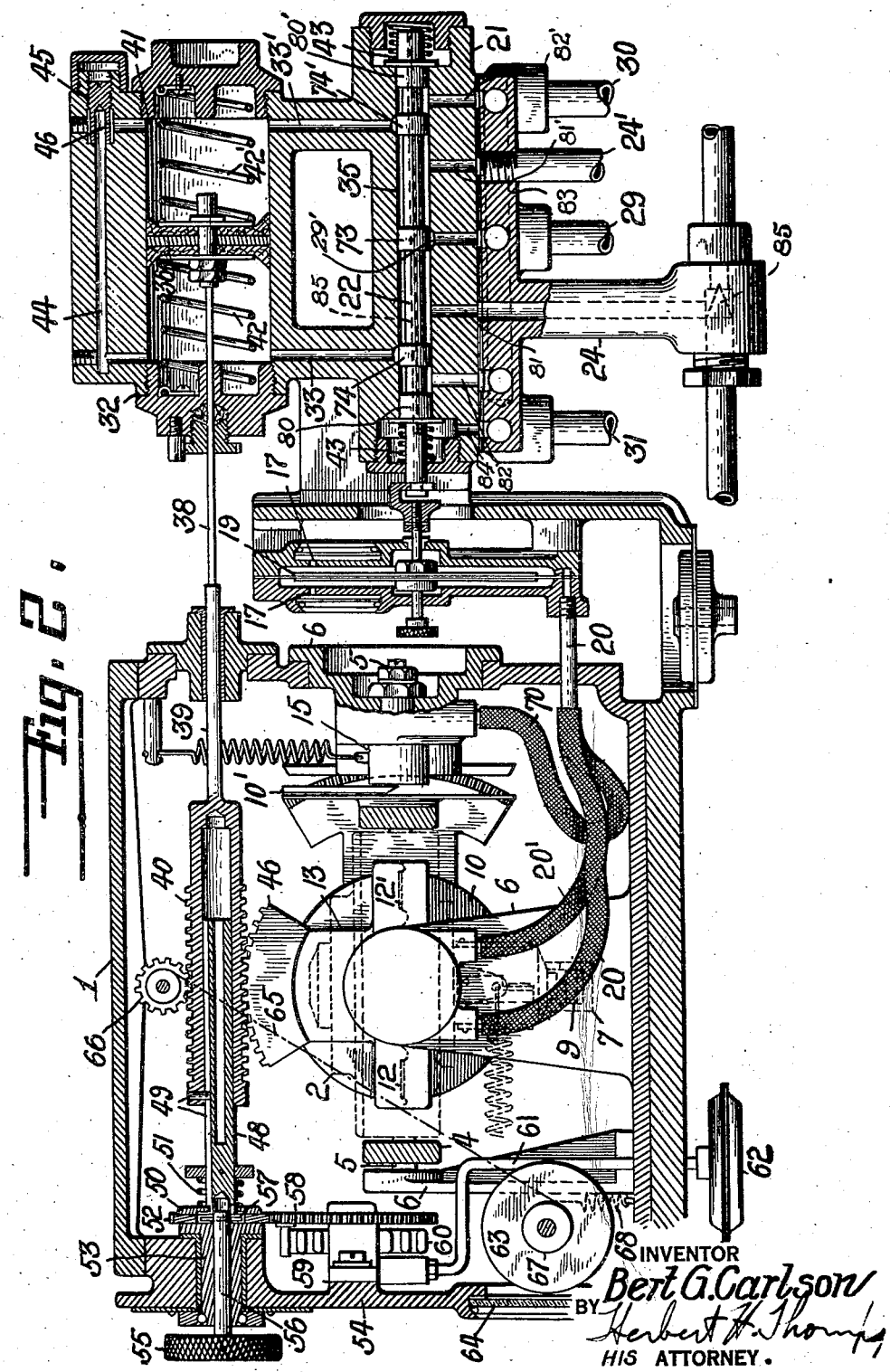
Fig. 2 is a detail view, largely in section, of the structure of Fig. 1.

Valve 21 is shown diagrammatically in Fig. 1 and more in detail in Fig. 2, the parts being correspondingly numbered. The slide rod or piston valve proper 22 is shown as having a central collar or piston normally overlying intake port 29' from pipe 29 leading to the pump, spaced collars 74 and 74' normally covering ports 33 and 33' leading to the hydraulic follow-up cylinder 32, and end collars 80 and 80'. In addition to the ports mentioned above, bore 35 is provided with ports 81 and 81' normally between collars 73, 74 and 73', 74', respectively, and connected with pipes 24 and 24' leading to servo cylinder 23. A second pair of ports 82 and 82' between collars 74—80 and 74'—80' are both connected to the return pipe 30, ports 82 and 82' being cross connected through dotted passage 83. An outer drain port 84 may also be provided to drain back the oil that leaks past the collars into return pipe 31, said port being connected to the outer end of rod 22 through an aperture 85 through the rod. A needle valve 86 is shown in one of pipes 24, 24' to regulate the rate of oil flow to the servo cylinder.

The hydraulic follow-up comprises a cylinder 32 preferably mounted directly upon the master hydraulic valve 21 and having its end portions connected through passages 33 and 33' to the bore 35 of valve 21. A follow-up piston 36 is movable within the bore 41 of cylinder 32 and has a piston rod 38 extending outwardly of cylinder 32 for connection to the shaft 39 of a worm 40 within gyro unit 1. Centering springs 42, contained within bore 41 and engaging follow-up piston 36, tend to retain this piston in centered position within cylinder 32, while centering springs 43 within the valve 21 serve to center the balanced piston valve 22.

A by-pass passage 44 is provided around follow-up piston 36, which passage is restricted by a suitable valve such as the valve 45, shown as a needle valve in Fig. 1 and as a plug valve in Fig. 2, the plug or needle valve having a small opening 46 for by-passing or bleeding pressure fluid at the desired rate. Obviously, the valve may be left closed, if desired. Bore 41 of the hydraulic follow-up cylinder has the same fluid capacity as the servo motor cylinder 23 and, as will further appear, working fluid discharged from cylinder 23 flows into bore 41 for actuating the follow-up piston 36 and, but for the small leak through by-pass valve 45, i. e. if the by-pass valve is closed, the piston 36 would have a movement equal or proportional to that of the servo motor piston 27.

Worm 40 meshes with a gear segment 46 that is fixed upon frame member 13. Worm 40 has a longitudinal bore for slidably receiving a shaft 48 that is splined to worm 40 as by slot and pin means 49. A spring pressed clutch disc 50 is splined on shaft 48 and is urged by spring 51 into engagement with a gear 52 carried by a hub 53 journaled in the forward wall 54 of gyro unit 1. A knob 55 positioned in front of wall 54 has a stem 56 journaled in hub 53, which stem carries a cross-pin 57 adapted to engage a conforming recess in the end of shaft 48 when the knob 55 is pushed rearwardly, thereby coupling knob 55 and stem 56 to shaft 48. In pushing knob 55 rearwardly, the cross-pin 57 also engages clutch disc 50 to disengage this clutch disc from gear 52.

Gear 52 meshes with a gear 58 journaled on a fixed support 59. A Bourdon tube 60 has one end fixed to gear 58 and its other end fixed to support 59, and is connected by a pipe 61 to a diaphragm casing 62 containing a flexible diaphragm exposed to the atmosphere, whereby gear 58 is caused to turn in response to changes in atmospheric pressure due to changes in altitude of the aircraft. If desired, the pipe 61 could be connected to the intake manifold of the aircraft engine, wherein the air pressure is also variable in response to ascent or descent of the craft.

A turnable indicator cylinder 63 is located behind a window 64 provided in the front wall 54 and has its hub 67 connected by a flexible connector or tape 65 to the hub of a gear 66, meshing with worm 40. Connector 65 has one end fixed to the hub of gear 66 and extends down and around the hub 67 of cylinder 63 and has its other end attached to a spring 68 that is anchored and serves to tension connector 65. The surface of cylinder 63 is marked with angle indications 69 for indicating the fore and aft tilt of the aircraft with respect to the horizontal.

Although the master control valve 21, servo motor 23 and hydraulic follow-up have been described in connection with the control of the elevator 25, it will be understood that similar equipment is provided for the ailerons and rudder of the aircraft. Thus, the air pick-off, including ports 14 and 14' of frame member 15, is connected by pipes 70 to a flexible diaphragm casing (not shown) having a diaphragm connected to a master control valve for controlling the supply of pressure operating fluid to the aileron servo motor. Likewise a similar control is taken off the directional gyro for controlling the craft's rudder. It may be noted also that while followback piston 36 directly controls the pick-off valve-ports 10—12 at the gyroscope, the movement of said piston secondarily restores the relay valve, since restoration of the controller equalizes the air pressure in chamber 17, permitting centralizing springs 43 to restore the relay.

Figure 3:
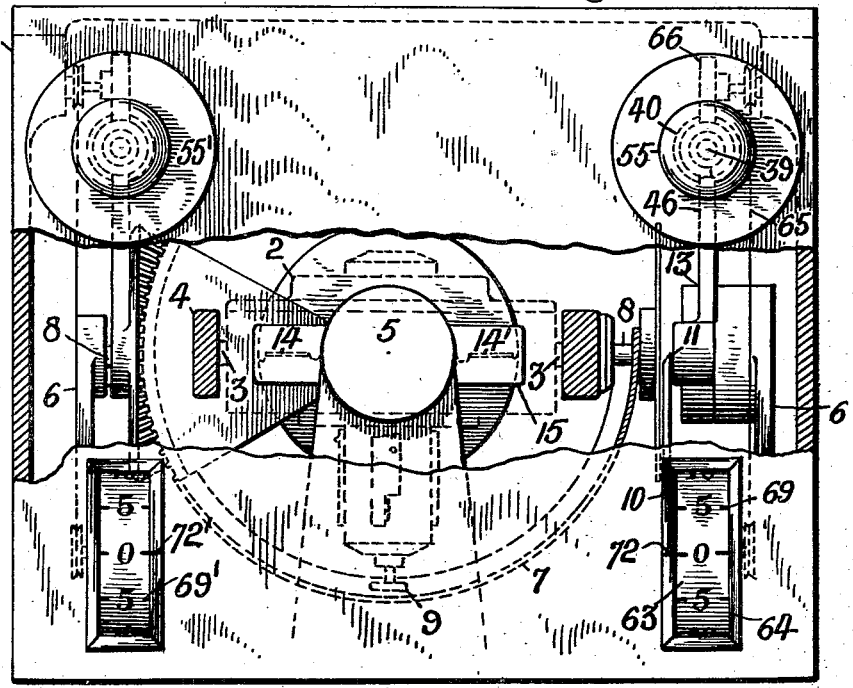
Fig. 3 is a view in front elevation, with parts broken away, of the gyro vertical or artificial horizon unit shown in Fig. 2.

In use, although the automatic pilot may be used in an airplane as the sole control means, it would ordinarily be employed as an adjunct to the usual manual controls, in which case the aviator may instantly take over the controls from the automatic pilot by opening the by-pass valves 71 associated with each of the servo motors (see Fig. 1). The aviator may then steer from the artificial horizon and directional gyroscope in the usual manner. To cut in the automatic controls, the craft is brought onto an even keel on a set course and the air and oil pumps 16 and 28 started working, the knob 55 having been previously adjusted, if necessary, so that scale 69 indicates zero inclination. The corresponding scale 69' of the aileron control associated with control knob 55' (see Fig. 3) should also be brought to zero before cutting in the automatic control and with the horizon bar showing zero transverse inclination. Likewise the corresponding scale of the directional gyro (not shown) should be brought to zero.

With the automatic control working, longitudinal and lateral stabilizing of the airplane will be maintained through the ports 12, 12' and 14, 14', respectively, on the gyro vertical 1, while the set course will be maintained through the functioning of the corresponding air ports on the directional gyro. Thus, assume, for example, that the airplane starts to ascend for any reason due, for instance, to movement of passengers within the plane cabin or to the shifting of the center of gravity of the plane due to fuel consumption. In such case, since the frame member 13, carrying ports 12 and 12', turns clockwise with the craft while the shutter knife edges 11 controlled by the gyro vertical remain horizontal, the port 12 is uncovered and port 12' is covered by shutter 10, resulting in the cutting off of the suction on pipe 20' so that diaphragm 19 is deflected toward the right, as shown in Fig. 1. Movement of diaphragm 19 causes piston valve 22 to move from its central position shown in Fig. 2, in which position supply pipe 29 is blocked by valve portion 73 while passages 33 and 33' are blocked by valve portions 74 and 74', toward the right into the position shown in Fig. 1. In this latter position of the valve, pressure fluid from pump 28 flows through pipe 29, into valve bore 35 and then into pipe 24 to the servo motor cylinder 23, thereby acting to move piston 27 upwardly and causing downward turning of elevator 25 from its horizontal position to correct for ascent of the craft.

As the piston 27 moves upwardly, operating fluid in advance of the piston is driven out through pipe 24' so that fluid from this pipe passes into valve bore 35 and thence through passage 33' into the cylinder 32, causing the hydraulic follow-up piston 36 to move toward the left from its centered position, thereby moving piston rod 38 and hence worm 40 toward the left so that gear segment 46 and ports 12 and 12' are turned counter-clockwise due to the combined movement of worm 40 and that of the craft under the action of control surface 25. This movement of ports 12 and 12' results in the covering of port 12 and the uncovering of port 12' so that diaphragm 19 is moved toward the left, causing master control valve piston 22 to move toward the left, effecting the elevation of elevator 25 so that, as the craft again assumes an even keel, the elevator 25 will again be substantially though not quite horizontal, the action of by-pass valve 45, when used serving to cause elevator 25 to return to a position slightly depressed from the horizontal, thereby providing a permanent correction for the tendency of the craft to climb.

This action of the follow-up by-pass will be evident when it is noted that as the elevator 25 was being depressed by upward movement of piston 27, the movement of follow-up piston 36 was not quite equal or proportional to that of piston 27 due to the slight leakage of fluid through by-pass 44 around piston 36 so that the ports 12 and 12' were not turned back as much as they would otherwise have been, so that after correction, the piston 27 is left slightly above central position in cylinder 23 with the elevator 25 slightly depressed while the ports 12 and 12' are horizontal.

If, in spite of this permanent elevator correction, the craft should still tend to ascend, the automatic operation of the elevator will be repeated, correcting for the ascent and leaving the elevator 25 depressed somewhat more than it was after the initial correction. In this way, after one or more operations of the servo motor 23, the craft is held on an even keel without repeated and subsequent operations of the servo motor, which intermittent operations would otherwise be necessary if the by-pass 44 were not present. In like manner, the system automatically corrects for any tendency of the craft to descend without repeated operations of the control surface servo motor.

When it is desired to make the craft climb or descend, it is merely necessary to press the knob 55 in slightly, thereby releasing clutch disc 50 while coupling stem 56 to shaft 48, and then turn the knob and hence shaft 48 in the proper direction to effect the desired maneuver. As shaft 48 is turned, the worm 40 turns gear segment 46 to move ports 12 and 12' and hence effect operation of the elevator. By turning knob 55', a similar control of the ailerons is obtained and by turning the corresponding knob on the directional gyro, the course of the craft may be changed as desired.

Since gear 66 is connected through worm 40 to gear segment 46, gear 66 turns in response to the turning of ports 12 and 12', and hence the reading of the angle indicator 69 on cylinder 63 with respect to mark 72 gives the inclination of the fore and aft axis of the craft with respect to the horizontal, while the reading of indicator 69' with respect to mark 72' gives the transverse inclination of the craft with respect to the horizontal, and the corresponding indicator of the directional gyro gives the deviation of the craft from its course.

The Bourdon tube 60 also acts to aid in maintaining the craft at any desired altitude during flight. Thus, should the craft start to ascend due, for example, to the consumption of fuel, the reduction in atmospheric pressure resulting from such ascent will cause the flexible diaphragm within casing 62 to deflect, thereby causing Bourdon tube 60 to turn gear 58 and effect the turning of gear 52, shaft 49 and worm 40 to turn ports 12 and 12', thereby automatically correcting for such ascent. Thus, the Bourdon tube 60 acts in addition to the vertical gyro for maintaining the craft on an even keel.

As many changes could be made in the above construction and many apparently widely different embodiments of this invention could be made without departing from the scope thereof, it is intended that all matter contained in the above description or shown in the accompanying drawings shall be interpreted as illustrative and not in a limiting sense.

What is claimed is:

1. In an automatic pilot for aircraft, the combination with a position maintaining means, of differential air flow means actuated by relative turning of the craft and means, a hydraulic servomotor system having a servomotor for operating a control surface, a pneumatically operated hydraulic valve actuated by the differential air pressure created by said means for controlling said servomotor, and a hydraulic follow-up at said valve for acting upon said means in response to movements of the control surface.

2. In automatic pilot for aircraft, the combination with a position maintaining means, of differential air flow means actuated by relative turning of the craft and means, a hydraulic servomotor system having a servomotor for operating a control surface, a pneumatically operated hydraulic valve actuated by the differential air pressure created by said means for controlling said servomotor, and a hydraulic follow-up connected to be operated by the flow of liquid between said valve and motor for acting upon said means in response to movements of the control surface.

3. In an automatic pilot for aircraft, the combination with a control unit, a differential air flow means actuated by relative turning of the craft and unit, a hydraulic servomotor for turning a control surface, a pneumatically operated hydraulic valve operated from the differential air pressure created by said means for controlling said servomotor, and a hydraulic follow-up from said valve to said means, whereby mechanical follow-back from said surface to said means is eliminated.

4. In an automatic pilot for aircraft, the combination with a control unit, a differential air flow means actuated by relative turning of the craft and unit, a hydraulic servomotor for turning a control surface, a pneumatically operated hydraulic valve operated from the differential air pressure created by said means for controlling the supply of pressure operating fluid to said servomotor, and a hydraulic follow-up positioned adjacent said unit and supplied with operating fluid exhausted from said servomotor for acting upon said means in accordance with movements of the control surface.

5. In an automatic pilot for aircraft, the combination with a position maintaining means, a differential air flow means actuated by relative turning of the craft and means, a hydraulic servomotor for turning a control surface, a pneumatically operated hydraulic valve operated from the differential air pressure created by said means for controlling the supply of pressure operating fluid to said servomotor, a hydraulic follow-up positioned adjacent said means and supplied with operating fluid exhausted from said servomotor for acting upon said means in accordance with movements of the control surface, and means for by-passing a portion of the operating fluid exhausted from said servomotor, whereby the control surface is caused to assume a new position of reference.

6. In an automatic pilot for aircraft, a stabilizing gyroscope, hydraulically operated means controlled from said gyroscope for controlling the ailerons and elevators, hydraulic follow-up means located adjacent said gyroscope and respectively controlled from said respective means, and bank and pitch indicators at said gyroscope connected to said respective follow-up means to be operated in accordance with movements of said ailerons and elevators.

7. In a control system for aircraft, a hydraulic pressure source, servo means connected with said source for actuating a control surface, air flow means, means pneumatically connected to said air flow means and responsive to pressure changes, a control valve actuated by said last named means for controlling the supply of pressure fluid from said source to said servo means, an altitude control unit for differentially effecting pressure changes in said control valve actuating means, and follow-back means to said unit operated from said valve.

8. In an automatic control system for aircraft, the combination with a gyroscope, of means for automatically controlling a control surface therefrom comprising a hydraulic pressure source, means for actuating said surface connected with said source, a valve for controlling the connection between said source and said surface actuating means, air circulating means, a differential air pressure diaphragm for controlling said valve, means having differential air flow ports connected with said diaphragm and said circulating means and movable with the aircraft relative to said gyroscope, whereby differential pressure changes are effected on the two sides of said diaphragm, and follow-back means from said valve to said port means.

9. In an automatic control system for aircraft, the combination with a gyroscope, of means for automatically controlling a control surface therefrom comprising a hydraulic pressure source, means for actuating said surface connected from said source, a valve for controlling the connection between said source and said surface actuating means, air flow means, a differential air pressure diaphragm for controlling said valve, means having differential air flow ports connected with said diaphragm and said flow means and movable with the aircraft relative to said gyroscope, whereby differential pressure changes are effected on the two sides of said diaphragm, and follow-back means from said valve to said port means, said follow-back means comprising a hydraulic cylinder connected to said valve, and a piston movable within said cylinder and connected to said port means.

10. In an automatic control system for aircraft, the combination with a gyroscope, of means for automatically controlling a control surface therefrom comprising a hydraulic pressure source, means for actuating said surface connected with said source, a valve for controlling the connection between said source and said surface actuating means, air flow means, a differential air pressure diaphragm for controlling said valve, means having differential air flow ports connected with said diaphragm and said flow means and movable with the aircraft relative to said gyroscope, whereby differential pressure changes are effected on the two sides of said diaphragm, and follow-back means from said valve to said port means, said follow-back means comprising a hydraulic cylinder connected to said valve, and a piston movable within said cylinder and connected to said port means, the connection between said piston and said port means including differential means to provide for simultaneous independent operation of said port means.

11. In an automatic pilot for aircraft, the combination with a gyroscope, a controller actuated by relative turning of the craft and gyroscope, a hydraulic servo motor for turning a control surface, a valve operated from said controller for controlling said servomotor, a hydraulically actuated follow-up from said valve to said controller, and a restricted fluid by-pass means for said hydraulic follow-up.

12. In an automatic pilot for aircraft, the combination with a gyroscope, a controller actuated by relative pitching of the craft and gyroscope, a fluid servomotor for turning a control surface, a fluid relay valve operated from said controller for controlling said servomotor, a fluid follow-up from said valve to said controller, said fluid follow-up having a restricted by-pass, and means responsive to altitude variations arranged for connection to said controller for maintaining the aircraft at a desired altitude.

13. In an automatic pilot for aircraft, the combination with a direction maintaining means such as a gyroscope, a controller thereat rendered operative upon relative turning of the craft and said means for turning the rudder, a relay device directly operated by said controller and positioned adjacent the same, a rudder operating servomotor operated by said device and adapted to be located adjacent the rudder and remote from said controller, and a follow-up means at said device constructed and arranged to move proportionally to said servomotor for imparting a follow-up movement to said controller without a mechanical connection to said servo motor or rudder.

14. A follow-up means for automatic pilots as claimed in claim 13, wherein the servomotor and relay comprise a hydraulic piston and slide valve respectively, and said follow-up means comprises a second hydraulic piston adjacent said slide valve and located in series with said valve and said first named piston.

15. In an automatic pilot for aircraft, the combination with an attitude control unit such as a gyroscope, a controller actuated by relative turning of the craft and unit, a source of hydraulic pressure, a hydraulic piston and cylinder for turning a control surface, a valve operated from said controller for controlling the fluid flow to and from said source and said piston, and a hydraulic follow-up piston and cylinder adjacent said controller in series with said first named cylinder, its control valve and said source, whereby a follow-back connection from the control surface to said controller is provided through the hydraulic system and without mechanical follow-back connection.

16. In an automatic pilot for aircraft, the combination with an attitude control unit such as a gyroscope, a controller actuated by relative turning of the craft and unit, means governed by said controller for causing fluid flow in a closed system, said system including a pair of spaced servo cylinders connected in series in said fluid system, and a control surface, one of said cylinders being adjacent said surface and operating the same, and said other cylinder being adjacent said unit and operating as a follow back connection thereto.

17. In an automatic pilot for craft, direction maintaining means, a fluid pressure relay actuated by said means, a fluid pressure servomotor controlled by said relay, and means associated with said relay subject to the fluid pressure in said servomotor for restoring said relay to neutral position.

18. In an automatic pilot for aircraft, the combination with an attitude control unit such as a gyroscope, a controller actuated by relative turning of the craft and unit, a relay controlled from said controller for causing fluid flow in a closed system, said system including a pair of spaced servo cylinders connected in series in said fluid system, and a control surface, one of said cylinders being adjacent said surface and operating the same, and said other cylinder being at said relay and operating to restore the same to neutral position.

19. In an automatic pilot for craft, direction maintaining means, a fluid pressure relay actuated by said means, a fluid pressure servomotor controlled by said relay, means responsive to fluid pressure acting on the servomotor for restoring said relay, and means for biasing said restoring means toward its neutral position.

20. In an automatic pilot for craft, direction maintaining means, a fluid pressure relay actuated by said means, a fluid pressure servomotor controlled by said relay, means responsive to fluid pressure acting on the servomotor for restoring said relay, means for biasing said restoring means toward its neutral position, and a bleeder for slowly diminishing the effective fluid pressure acting on said restoring means.

21. In an automatic pilot for craft, direction maintaining means, a pressure fluid relay connected to be actuated by said direction maintaining means, a servomotor controlled by said relay, a control surface actuated by said servomotor, a pressure chamber having a movable wall acted upon by the pressure acting on the servomotor and operating to restore the relay to its neutral position, and yielding means counteracting a movement of said movable wall relatively to said chamber.

BERT G. CARLSON.